C. RADIGUER.
VARIABLE SPEED UNIVERSAL HYDRAULIC TRANSMISSION APPARATUS.
APPLICATION FILED DEC. 19, 1913.
1,161,157.
Patented Nov. 23, 1915.
4 SHEETS—SHEET 4.
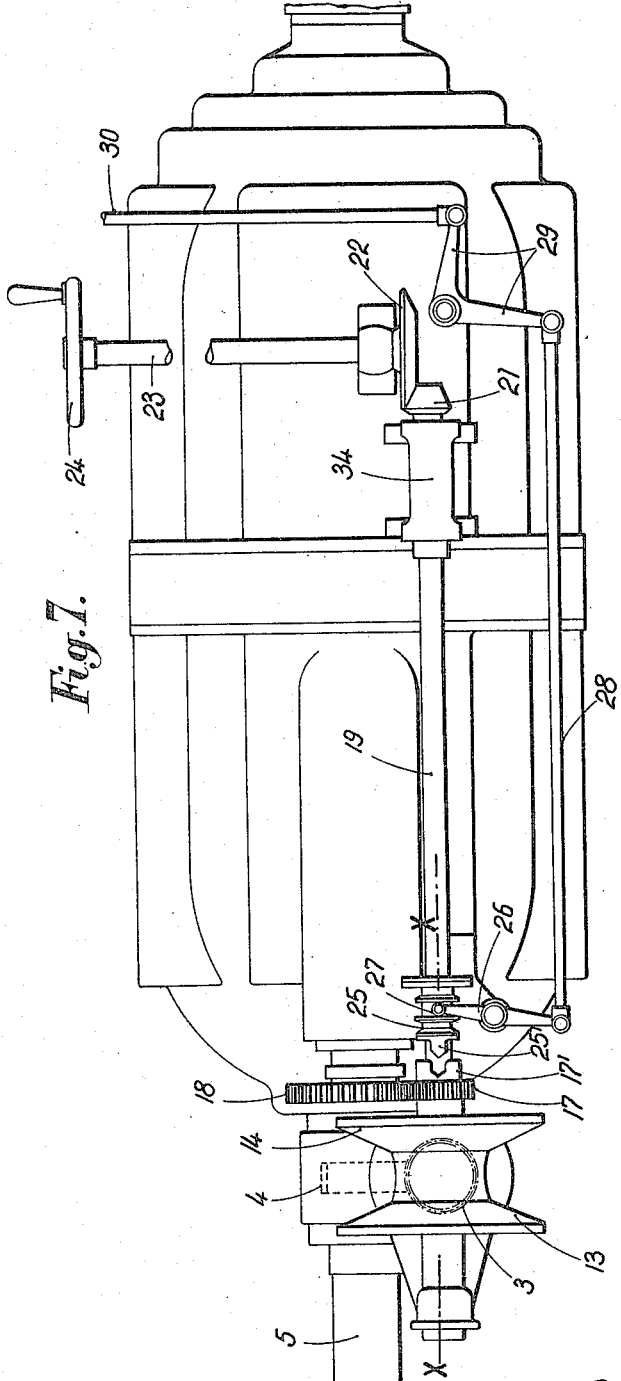

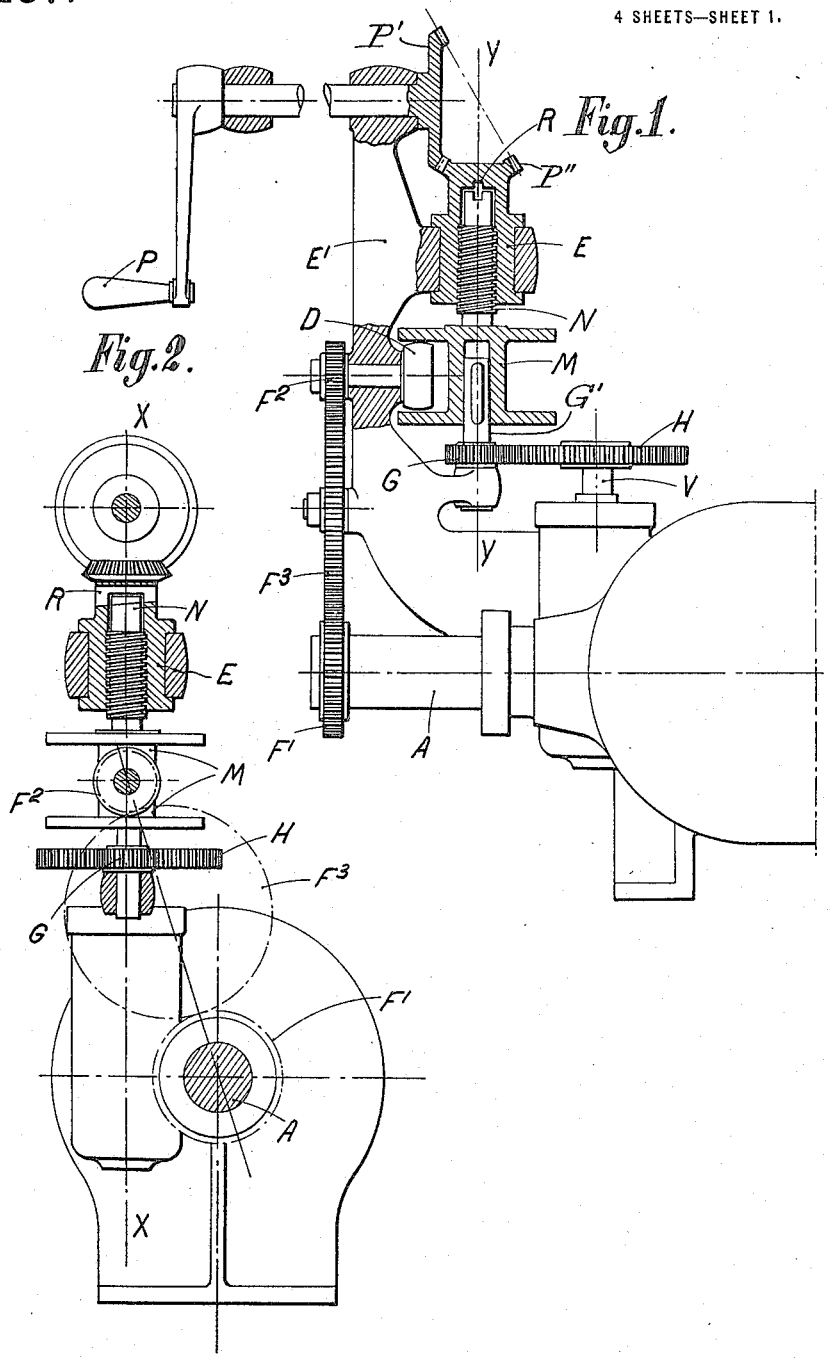

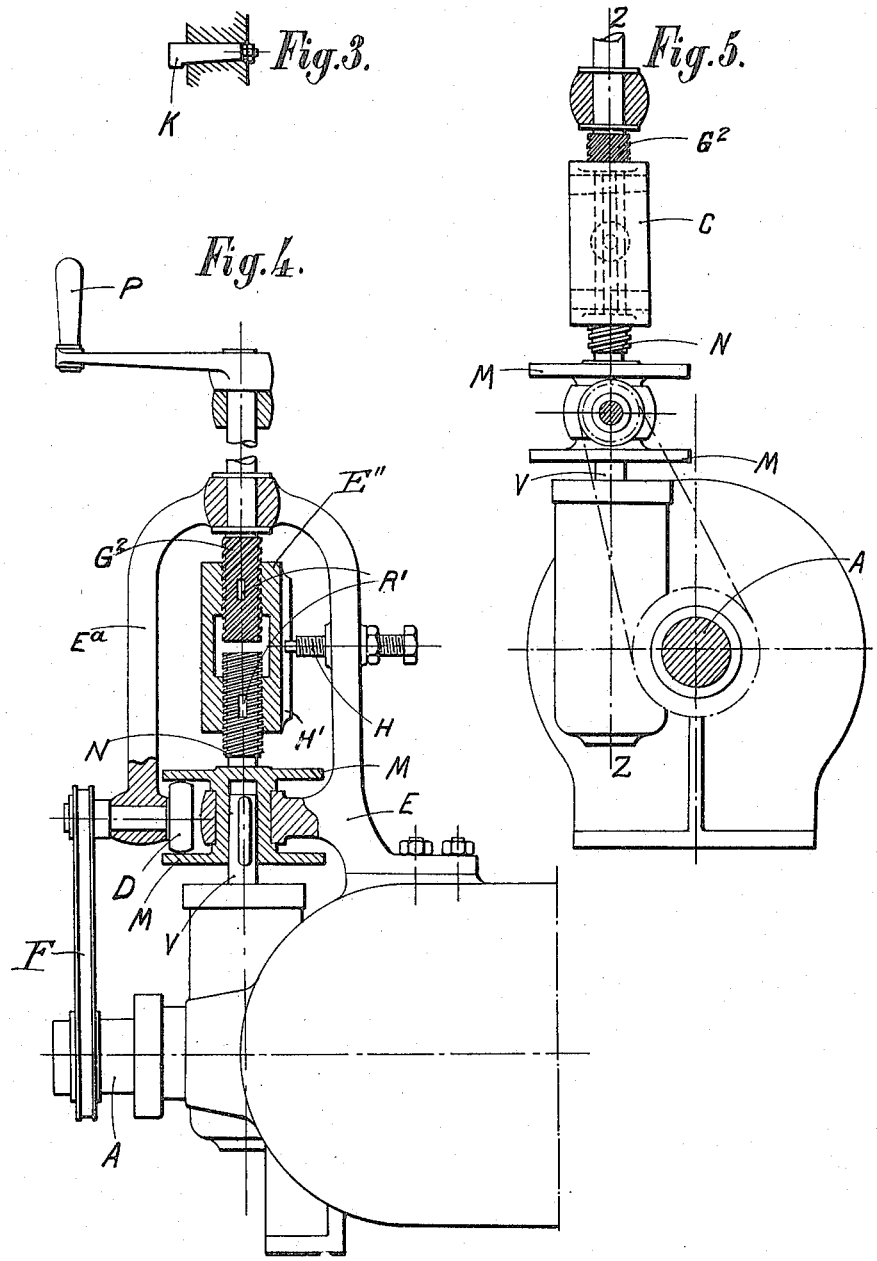

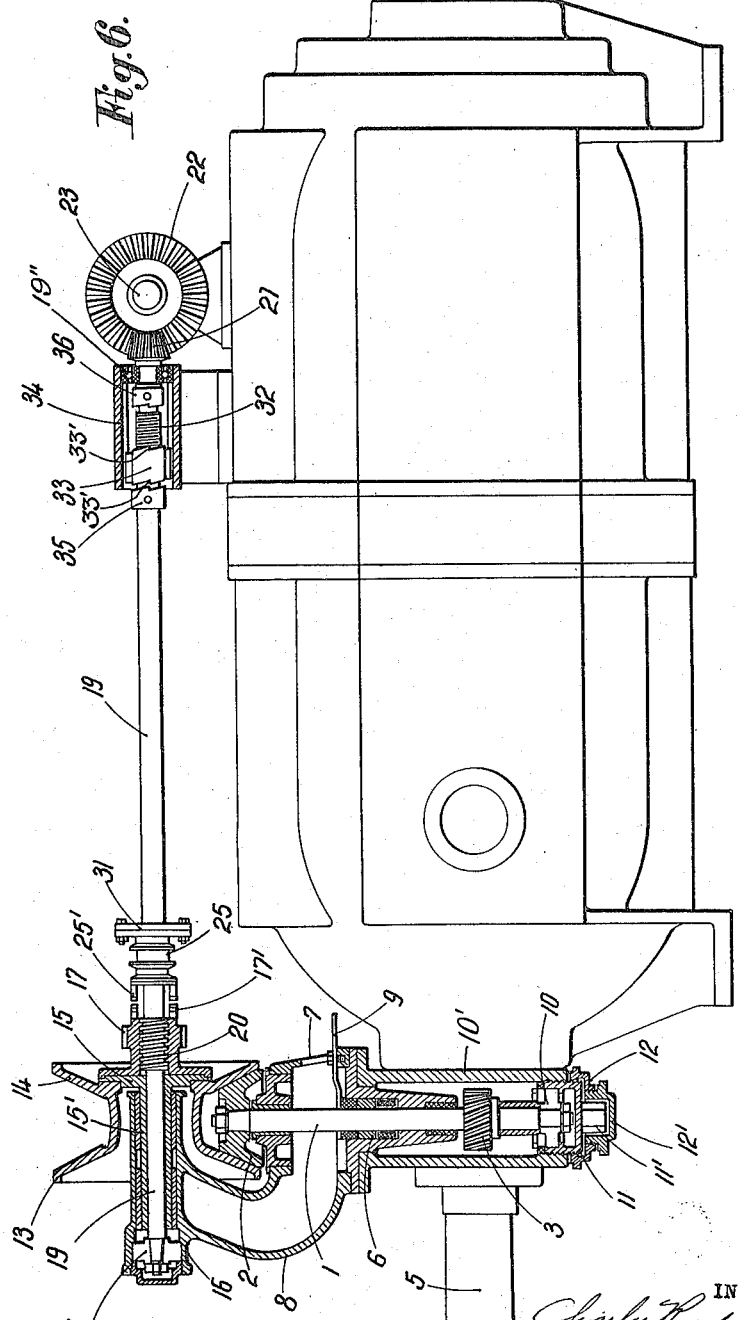

UNITED STATES PATENT OFFICE.

CHARLES RADIGUER, OF ST.-DENIS, FRANCE, ASSIGNOR TO SOCIÉTÉ ANONYME DES ETABLISSEMENTS DELAUNAY-BELLEVILLE, OF ST.-DENIS, FRANCE, A CORPORATION OF FRANCE.

VARIABLE-SPEED UNIVERSAL HYDRAULIC TRANSMISSION APPARATUS.

1,161,157.     Specification of Letters Patent.      Patented Nov. 23, 1915.

Application filed December 19, 1913. Serial No. 807,793.

*To all whom it may concern:*

Be it known that I, CHARLES RADIGUER, citizen of the French Republic, residing at St.-Denis, Department of the Seine, in France, have invented certain new and useful Improvements in Variable-Speed Universal Hydraulic Transmission Apparatus; and I do hereby declare the following to be a full, clear, and exact description of the invention, such as will enable others skilled in the art to which it appertains to make and use the same.

The present invention relates to controlling devices for variable speed transmission mechanism, and particularly to controlling devices for hydraulic transmission mechanism of the Janney type. In this type of hydraulic transmission mechanism, the speed and direction of rotation of the driven shaft is controlled by means of a "tilting box", the inclination of which determines the speed and direction of rotation of the driven shaft. This "tilting box" is acted upon by a rotatable rod, in the present instance, termed the controlling rod.

It is the object of the present invention to provide mechanical means for actuating the above-mentioned controlling rod, said means being capable of deriving power from the transmission mechanism itself and, therefore, capable of power actuation. A controlling means having these characteristics is disclosed in my co-pending application, Serial No. 798,048, filed October 29, 1913, but the present invention differs from that disclosed in said co-pending application in the specific construction of the means for moving the actuated part of the controlling device into and out of operative relation with the corresponding actuating part of the transmission mechanism. In the pending application above referred to, this is accomplished by means of an oscillating lever, but this is not practical in cases where it is desired to control the operation of the transmission mechanism from some point remote from the transmission mechanism. In the present instance, the oscillating lever above referred to is replaced by a system of rotary elements consisting of rotary gears and shafts, which will hereinafter be more fully described.

Another object of the invention is to provide means for rendering the controlling means operable by hand, so that the "tilting box" may be actuated by hand when so desired to effect change in speed or change in the direction of rotation of the driven shaft of the transmission mechanism.

The invention is illustrated in the accompanying drawings, in which:—

Figure 1 is a side elevation, partly in section, of a portion of a hydraulic transmission mechanism having the improved controlling means applied thereto, the section being taken on the line X—X of Fig. 2; Fig. 2 is an end elevation, partly in section, of the construction shown in Fig. 1, the section being taken on the line Y—Y of Fig. 1; Fig. 3 is a detail view showing the key employed when it is desired to actuate the controlling means by hand; Fig. 4 is a side elevation, partly in section, of a modified form of controlling means, the section being taken on line Z—Z of Fig. 5; Fig. 5 is an end elevation of the construction shown in Fig. 4; Fig. 6 is a side elevation, partly in section, of still another form of controlling means, the section being taken on the line X—X of Fig. 7; and Fig. 7 is a top plan view of the construction shown in Fig. 6.

Referring to the drawings, and particularly to Figs. 1 and 2, the controlling rod V for actuating the "tilting box" above referred to, carries a gear H which meshes with a pinion G, which, in turn, is fixedly carried by an auxiliary rod or stub-shaft G'. The stub-shaft G' is vertically disposed and is rotatably mounted in a bracket E' carried by the casing of the transmission mechanism. Keyed upon the stub-shaft G' is a friction member M having two spaced friction disks, between which, a friction roller D operates. The said friction roller D is disposed in a plane substantially at right angles to the disks of the friction member M, and is normally out of contact with both of the same. The friction roller D is power-driven from the shaft A of the transmission mechanism by means of a train of gearing F¹, F³, F². From the construction so far described, it is obvious that if the friction member M be moved in either direction axially of the stub-shaft G', one or the other of the friction disks of the member M will come in contact with the friction roller D and will be rotated by the latter, the direction of rotation depending upon which friction disk is brought into contact with the friction roller D. In either direction of rotation of the member M, the stub-shaft G' will be rotated, and thereby rotate the controlling rod V through the intermediary of the gears G and H. The construction so far described is substantially the same as that disclosed in the co-pending application above referred to, except that in said application the friction member M is mounted directly on the controlling rod V and the gearing G, H is dispensed with. The means for moving the friction member M axially of the stub-shaft G', in the present instance, differs from that disclosed in the co-pending application in that, in the present instance, a handle P is provided, which, when actuated, rotates through the intermediary of the beveled gears P' and P'', a rotatable sleeve E carried by a portion of the bracket E', as will be clear from an inspection of Fig. 1. The sleeve E is internally threaded to receive the threads of a screw N rigidly carried by the friction member M. When the sleeve E is rotated by the handle P, the relative rotation between the sleeve E and the screw N will cause a longitudinal movement of the screw N in the sleeve E, which will result in the bringing of one of the friction disks of the member M into contact with the friction roller D. The friction member M will then be power-driven and will effect the desired rotation of the controlling rod V. It will be noted, however, that if the handle P is moved and then subsequently held stationary, the rotation of the friction member M by the roller D will cause the screw N to turn in the sleeve E, which will effect an axial movement of the member M back to its original position. It will, therefore, be seen that as long as pressure is exerted on the handle P, the friction member M will be driven by the roller D, but that as soon as the rotation of the handle P is discontinued, the rotation of the screw N relative to the sleeve E will cause axial movement of the friction member M and restore the latter to its original position. It may sometimes be desirable to actuate the controlling means by hand, that is, to turn the controlling rod V manually instead of by power derived from the transmission mechanism. For this purpose, a key-way R is provided, a portion of which is formed in the sleeve E, and the other portion in the top of the screw N, as clearly shown in Fig. 1, to receive a key K, illustrated in Fig. 3. When this key is inserted, the sleeve E is locked to the screw N and rotation of the handle P will then cause rotation of the screw N with the sleeve E. The friction member M will, therefore, be directly rotated from the handle P, and as there is no relative rotation between the screw N and the sleeve E, the friction member M will not be shifted axially into contact with the roller D.

In the form of the device shown in Figs. 4 and 5, the gears F¹, F³, F², are replaced by a belt F and the friction member M is mounted directly upon the controlling rod V. Furthermore, the sleeve E'', corresponding to the sleeve E of the form above described, in addition to having a threaded portion for receiving the screw N, has a further threaded portion for receiving a second screw G², which is rotatably mounted in the bracket Eª. The handle P is directly connected with the screw G². The rotation of the screw G² by the handle P will cause longitudinal movement of the sleeve E'', the latter being held against rotation by means of a screw H, so set that its extremity will engage in a slot H' provided in the side of the sleeve E''. This longitudinal movement of the sleeve E'' will effect movement of the friction member M axially of the controlling rod V to bring one or the other of the friction disks into engagement with the power-actuated friction roller D. When the rotation of the handle P is discontinued, the continued rotation of the friction member M will rotate the screw N in the sleeve E'', and, therefore, the friction member M will be restored to its original position. As will be noted from Fig. 4, the pitch of the threads of the screws N and G² need not be the same, as the threads on the latter screw may have a much greater pitch than those on the screw N. When it is desired to actuate the controlling rod V by manual means, the two screws N and G² are locked to the sleeve E'' by means of two keys similar to that shown in Fig. 3, which are inserted through openings in the sleeve E'' and corresponding openings R' provided in the screws N and G². The screw H is then withdrawn from engagement in the slot H' and rotation of the handle P will then effect rotation of the friction member M without producing axial movement thereof. The controlling rod V is, therefore, directly and manually operated from the handle P.

In the modification shown in Figs. 6 and 7, the friction roller 2 is actuated and carried by a shaft 1 carrying a worm wheel 3 meshing with a corresponding worm wheel 4 carried by the shaft 5 of the transmission mechanism. A packing 6 surrounds the shaft 1 and is rendered accessible by means of an opening 7 provided in the bracket-like casing 8, hereinafter referred to. A key 9 is provided for tightening the packing and may remain in the position shown in Fig. 6. In order to permit adjustment of the shaft 1 to compensate for wear, the lower portion of the shaft 1 is mounted in a cap 11 by means of the cross members 10. The cap 11 has threaded engagement with the casing 10', as clearly shown in the drawing and carries a hexagonal nut 11' by which the cap 11 may be turned by means of a wrench or similar tool. When so turned, the cap 11 adjusts the shaft 1 longitudinally. A locking ring 12 is provided having an opening for receiving the threaded hub portion of the cap 12'. To adjust the shaft 1, it is only necessary to remove the cap 12', and then access may be had to the hexagonal nut 11'. In the form of the device now being described, the friction roller 2 is made conical in shape and the friction disks 13 and 14, corresponding to the friction disks of the member M in Figs. 1 to 5, inclusive, are each accordingly conical shaped for proper coöperation with the friction roller 2. The friction disks 13 and 14 are unitarily carried by the flange 15 of a sleeve 15' loosely mounted on a shaft 19. The flange 15 has rigidly secured thereto, a pinion 17 which is internally threaded to receive the threads of the screw 20 formed on the shaft 19. The pinion 17 meshes with a gear 18 (Fig. 7), which is connected with the controlling rod of the transmission mechanism. The shaft 19 is rotatably mounted at one end in the cross members 19' located in the box-like portion 16 of the casing 8. The other end of the shaft 19 is rotatably supported on the casing by means of a ball-bearing 19'', and carries at its extreme end portion a beveled pinion 21 meshing with a beveled gear 22, which latter is secured to a shaft 23 extending to the point from which it is desired to control the transmission mechanism. A hand-wheel 24 is provided on the shaft 23 at such point as to render the same capable of rotation by hand. By the construction so far described, it is obvious that when the hand-wheel 24 is rotated, the shaft 19 will be rotated and the relative rotation between the screw 20 and the pinion 17 will cause an axial movement of the friction disks 13 and 14 to bring one or the other into contact with the friction roller 2. When movement of the handle 24 is discontinued, the further rotation of the disks 13 and 14, by the friction roller 2, will restore the disks 13 and 14 to their normal position, as the pinion 17 will then rotate relative to the screw 20 and shift the disks 13 and 14 axially back to their original position. During the rotation of the disks 13 and 14 and the pinion 17, the controlling rod is actuated by means of the gear 18 meshing with the pinion 17. In order to render this form of controlling means manually operable, a clutch sleeve 25 is provided on the shaft 19, which sleeve carries clutch teeth 25' for coöperation with corresponding teeth 17' provided on the pinion 17. The clutch sleeve 25 is keyed to the shaft 19 and may be actuated longitudinally of the shaft 19 by means of a rock lever 26 having a forked extremity 27 engaging the sleeve 25, in the well-known manner. The rock lever 26 may be actuated by a longitudinally movable link 28 connected to a bell-crank lever 29, which, in turn, is actuated by means of a rod 30 passing to the station from which the transmission mechanism is controlled. Actuation of the clutch sleeve 25 to engage the teeth 17' and 25' will first move the disks 13 and 14 to their true intermediate position, due to the inclination of the opposite sides of the teeth 17' and 25', respectively. When the teeth 17' and 25' are so engaged, rotation of the hand-wheel 24 will serve to rotate the pinion 17 as well as the screw 20, and there will, therefore, be no relative rotation between the screw 20 and the pinion 17. No axial movement of the disks 13 and 14 will take place, but the rotation of the pinion 17 will serve to actuate the controlling rod through the intermediary of the gear 18. In order to positively stop rotation of the hand-wheel 24 when the "tilting-box" has been inclined its maximum amount, the shaft 19 carries two clutch members 35 and 26 rigidly secured thereto. Between these clutch members, the shaft carries a threaded portion 32 passing through the interiorly threaded hub portion of the longitudinally movable nut 33. The said nut is provided with oppositely disposed projections which engage in slots provided in the casing 34, and, therefore, its rotation with the shaft 19 is prevented. As shaft 19 rotates, it is obvious that the nut 33 will be moved longitudinally. In the normal position of the parts, the nut 33 will be disposed midway between the clutch members 35 and 36. Rotation of the handle 24 a sufficient distance will cause movement of the nut 33 in one direction or the other until the clutch teeth 33' carried thereby will engage with the corresponding teeth on either the clutch member 35 or 36. The rotation of the hand-wheel 24 and the shaft 19 will then be positively stopped, and the continued rotation of the disks 13 and 14, by the roller 2 will shift the said disks 13 and 14 back to their intermediate position, in the manner above described, in which position both of the disks will be out of engagement with the roller 2, and the "tilting-box" will, therefore, remain in the position into which it has been brought.

The last described modification of the apparatus possesses certain advantages not possessed by the other forms described, to wit, the shaft of the friction roller may be adjusted to compensate for wear, the controlling device may be actuated from a distant point, and the device for rendering the controlling means capable of manual operation may also be brought into operation from such distant point.

Obviously, numerous modifications and changes may be made in the details of the construction, as above described, without departing from the spirit or scope of the invention, as defined in the accompanying claims.

What I claim is:—

1. In a variable speed hydraulic transmission mechanism, a rotatable controlling rod, an actuated friction member designed to rotate said rod and comprising two spaced friction disks connected to rotate in unison, an actuating friction wheel disposed between said disks and normally out of engagement with both of the same, means to rotate said friction wheel, and means comprising a plurality of rotatable elements to shift said disks into and out of operative engagement with said friction wheel.

2. In a variable speed hydraulic transmission mechanism, a rotatable controlling rod, an actuated friction member designed to rotate said rod and comprising two spaced friction disks connected to rotate in unison, an actuating friction wheel disposed between said disks and normally out of engagement with both of the same, means to rotate said friction wheel, and means comprising a rotatable handle to shift said disks into and out of operative relation with said friction wheel.

3. In a variable speed hydraulic transmission mechanism, a rotatable controlling rod, a friction wheel, means to rotate the same, an axially movable friction member designed to rotate said controlling rod and having two spaced friction disks between which said friction wheel is positioned, and means to move said friction member axially to bring either of said disks into engagement with said friction wheel comprising an internally threaded sleeve, a threaded shaft coöperating therewith, and means to produce relative rotation between said sleeve and the threaded shaft to move said friction member axially.

4. In a variable speed hydraulic transmission mechanism, a rotatable controlling rod, a power-actuated friction wheel, a friction member coöperating therewith designed to rotate said controlling rod and comprising two spaced friction disks either of which is designed to be brought into engagement with the friction wheel by axial movements of said friction member, and means to produce axial movements of said friction member comprising a threaded portion associated with said member, a rotatable element having a threaded portion to receive the threaded portion of said friction member, and means to rotate said element.

5. In a variable speed hydraulic transmission mechanism, a rotatable controlling rod, a power-actuated friction wheel, a friction member coöperating therewith designed to rotate said controlling rod and comprising two spaced friction disks either of which is designed to be brought into engagement with the friction wheel by axial movements of said friction member, and means to produce axial movements of said friction member comprising a threaded portion associated with said member, a rotatable element having a threaded portion to coöperate with the threaded portion of said friction member, means to rotate said element relative to the threaded portion of said friction member to thereby move the latter axially, and means to establish a positive connection between said element and the threaded portion of the friction member whereby rotation of said element will directly rotate the friction member without producing axial movement thereof.

In testimony whereof I affix my signature, in presence of two witnesses.

CHARLES RADIGUER.

Witnesses:
EMILE BERTRAND,
EMIL. KLOH.

Copies of this patent may be obtained for five cents each, by addressing the "Commissioner of Patents, Washington, D. C."